No. 740,856. PATENTED OCT. 6, 1903.
C. L. HOFMANN.
LUBRICATOR.
APPLICATION FILED MAR. 2, 1903.
NO MODEL.

WITNESSES
Geo. P. Kingsbury
Perry B. Turpin

INVENTOR
Clifford L. Hofmann
BY Munn & Co.
ATTORNEYS.

No. 740,856. Patented October 6, 1903.

UNITED STATES PATENT OFFICE.

CLIFFORD L. HOFMANN, OF CINCINNATI, OHIO, ASSIGNOR OF ONE-HALF TO S. STANLEY KLEIN, OF CINCINNATI, OHIO.

LUBRICATOR.

SPECIFICATION forming part of Letters Patent No. 740,856, dated October 6, 1903.

Application filed March 2, 1903. Serial No. 145,722. (No model.)

*To all whom it may concern:*

Be it known that I, CLIFFORD L. HOFMANN, a citizen of the United States, and a resident of Cincinnati, in the county of Hamilton and State of Ohio, have made certain new and useful Improvements in Lubricators, of which the following is a specification.

My invention is an improvement in lubricators, and especially in that class of such devices for application to pulleys and the like wherein the pulley revolves on a bearing or shaft and the lubricator revolves with the pulley; and the invention consists in certain novel constructions and combinations of parts, as will be hereinafter described and claimed.

Figure 1:
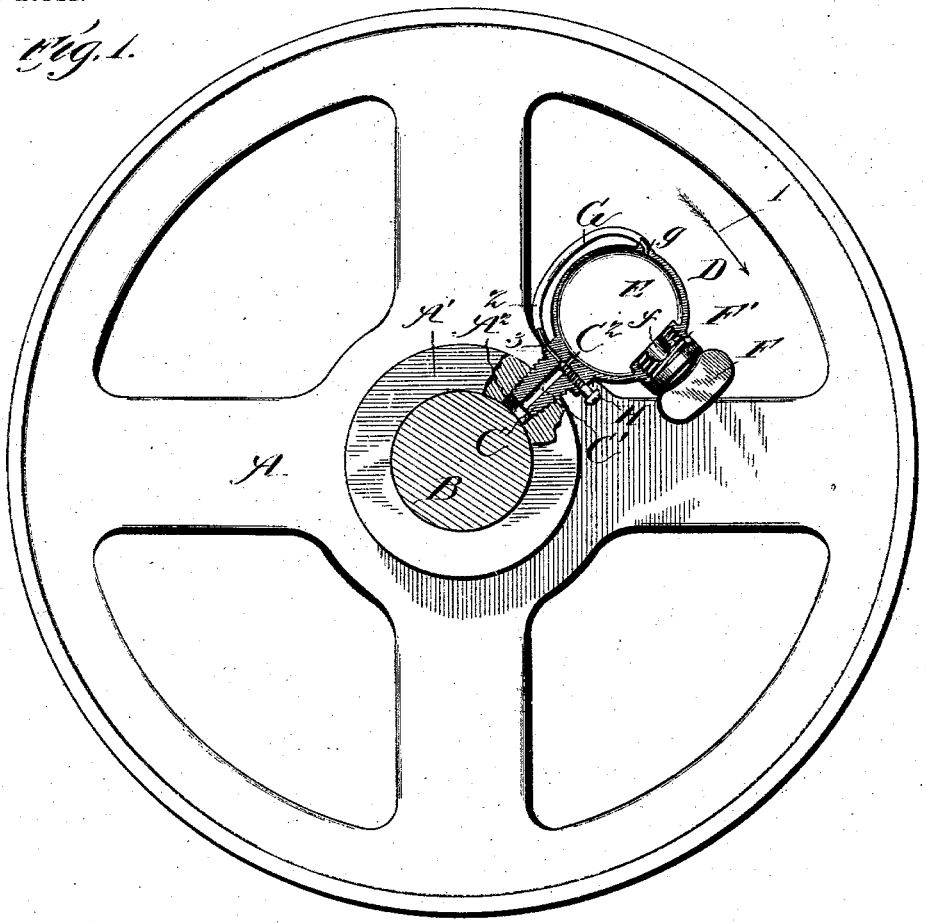
Figure 2:
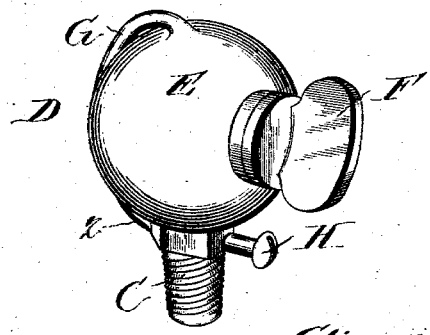

In the drawings, Figure 1 is a side elevation, partly in section, of my invention as in use; and Fig. 2 is a detail perspective view of the lubricator detached.

In the construction shown the pulley A is journaled on the shaft B and has its hub A' provided with an opening $A^2$, leading to the shaft and threaded for the reception of the shank C of the lubricator D. As shown, the lubricator D comprises the cup or reservoir E, the threaded shank or stem C, the filling-plug F, and the tube or channel G and the regulating-screw H. As shown and as is preferred, the stem or shank C, cup E, and tube or channel G are integral. The tube G connects with the upper outer portion of the cup E at a point slightly in rear of the center of said cup with respect to the direction of rotation, as indicated by the arrow 1 in Fig. 1, and the tube G extends from its connection $g$ with the cup E slightly to the rear and then inwardly toward the center of the pulley and has its inner end deflected at 2 toward the point 3, where it unites with the stem or shank C at a point comparatively near the juncture of the shank with the body of the cup E. The shank C has a channel C', leading inwardly from the connection 3 of the tube to the bearing or shaft B, and is also provided with a channel $C^2$, leading from the inner end of the channel C' into the cup E and being practically a continuation of the channel C', the screw H crossing and separating the channels C' and $C^2$ and being arranged at its inner end to operate as a valve by which to regulate or cut off the flow of oil through the tube G to the channel C' and thence to the bearing. The channel $C^2$, in connection with the screw-valve H and the channel C', is an important feature of my invention, as by it I permit air to feed into the inner end of the cup E in the operation of the device when the screw H is opened, and thus prevent the formation of a vacuum at the inner end of the cup E as the pulley revolves.

The filling-plug F threads at F' into the cup E and has its threaded portion cut away on one side at $f$, so the cup E can be filled by inserting the nozzle of the oil-can in the opening $f$ without fully withdrawing the plug from the cup.

It will be understood that the air-vent $C^2$ is considerably smaller, as shown, than that of the channel C'—that is to say, the channel C' is continued but is reduced in size beyond or above the regulating-screw H—and in practice the channel $C^2$ should not ordinarily be much larger than an ordinary pin-hole. This channel $C^2$ is made smaller, so that no oil will flow through it by gravity when at rest or be drawn through by vacuum in any considerable quantity while in motion.

It will be noticed that the channel C' is considerably larger than the bore of the tube G, so that air passing from the bearing through the channel C' may pass the oil fed by the tube G to said channel C' and thence to the bearing.

Having thus described my invention, what I claim as new, and desire to secure by Letters Patent, is—

1. The improved lubricator for pulleys herein described comprising the oil-cup, the stem or shank at the inner end thereof, an oil-channel leading from the extremity of said stem toward the cup, an oil tube or channel connected at one end with the cup at the outer side of the latter and slightly to the rear with respect to the direction of movement and connecting at its inner end with the stem or shank, an air-venting channel being provided leading from the inner end of the oil-feed channel into the oil-cup, and the screw-valve passing between the adjacent ends of the oil-feed channel and the air-channel and seating at the port discharging from the tube into the stem or shank whereby the screw-valve may regulate the flow of oil and will also control the air-venting channel substantially as set forth.

2. A lubricator comprising a closed cup having a hollow stem, a return oil tube or channel communicating with the outer end of the cup and extending thence inwardly toward the bearing to be lubricated, the cup being provided at its inner end with an air-vent to prevent the formation of a vacuum in the cup substantially as set forth.

3. A lubricator comprising a closed cup having a stem or shank and an oil-feeding channel therein, a return tube or channel connected at one end with the outer end of the oil-cup and discharging at its other end to the stem or shank in communication with the oil-feeding channel, the cup being provided with an air-venting channel leading from the oil-feeding channel, and a valve whereby to regulate the flow of oil and to control the air-venting channel substantially as set forth.

4. A lubricator having a closed oil-cup, a stem having an oil-feeding passage and an air-venting channel the latter leading into said cup, the valve controlling the feed of oil and the venting-channel and the return tube or channel connecting the stem with the outer end of the cup substantially as set forth.

CLIFFORD L. HOFMANN.

Witnesses:
JAMES H. GUNNING,
LAURA C. LIPPERD.